United States Patent [19]
Dausch et al.

[11] 3,961,682
[45] June 8, 1976

[54] SOUND-ABSORBING WALL ELEMENT
[75] Inventors: Gerd Dausch, Wuppertal; Heinrich Klotz, Westhofen, both of Germany
[73] Assignee: Hermann Hemscheidt Maschinenfabrik, Germany
[22] Filed: Nov. 29, 1974
[21] Appl. No.: 528,543

[30] Foreign Application Priority Data
Dec. 5, 1973 Germany............................ 2360519

[52] U.S. Cl......................... 181/33 G; 181/33 GA
[51] Int. Cl.²............................................ E04B 1/82
[58] Field of Search............. 181/33 G, 33 G A, 71; 161/88, 92, 170, 168, 239, 240; 52/144, 145

[56] References Cited
UNITED STATES PATENTS

| | | | |
|---|---|---|---|
| 1,866,742 | 7/1932 | Young....................... | 181/33 G UX |
| 1,900,522 | 3/1933 | Sabine............................. | 52/144 X |
| 1,952,766 | 3/1934 | Mazer....................... | 181/33 G UX |
| 2,184,139 | 12/1939 | Cunnington................ | 181/33 G UX |
| 2,695,855 | 11/1954 | Stephens................. | 181/33 GA UX |
| 3,804,196 | 4/1974 | Horn et al........................ | 181/33 G |

FOREIGN PATENTS OR APPLICATIONS

| | | | |
|---|---|---|---|
| 1,017,767 | 10/1957 | Germany....................... | 181/33 GA |

*Primary Examiner*—John F. Gonzales
*Attorney, Agent, or Firm*—Berman, Aisenberg & Platt

[57] ABSTRACT

The invention concerns a sound-absorbing wall element made up of a plurality of layers, one layer comprising small shreds of reinforced pneumatic rubber tires, which tires are disintegrated to form the shreds, the shreds being bonded together to form a low-density irregular structure having pores.

4 Claims, 2 Drawing Figures

SOUND-ABSORBING WALL ELEMENT

This invention relates to sound-absorbing wall elements such as are used to attenuate sound in so-called "sound-proofing" installations and arrangements.

BACKGROUND OF INVENTION

One form of sound-proofing wall used at the present time consists of a frame supported by posts and having a back wall, the frame containing one or more sound-absorbing wall elements which form a sound absorbing layer in spaced relationship to the back wall so that there is a cavity between the back wall of the frame and the sound absorbing layer. This sound absorbing layer faces a source of sound and absorbs some of the incident sound waves, the transmitted residual sound waves impinging on the back wall which reflects some of the sound. The reflected sound passes through the cavity and then back through the layer of sound absorbing wall elements for a second time. The depth of the cavity is therefore chosen according to the frequency of the sound to be absorbed. The sound-absorbing wall elements may be mats of mineral wool protected by an external cover from the weather, from condensation and from mechanical damage. The external cover contains openings of diverse kinds for entry of the sound that is to be absorbed. However, this has the undesirable result that only some of the incident sound actually enters the layer of sound absorbing elements to be absorbed thereby, because part of the sound which impinges upon the surface of the external cover is reflected.

SUMMARY OF THE INVENTION

A primary object of the present invention is to provide a sound absorbing wall element which can be made inexpensively, and which is made of a material which will not easily rot or perish so that it does not have to have an external cover. The invention is accordingly directed to a sound absorbing wall element composed of pieces of reinforced pneumatic rubber tires which have been disintegrated, the said pieces being bonded together to form an irregular structure having pores.

The tires used for this purpose will normally be tires which are unsuitable or no longer suitable for their intended purpose, either because they are worn or because they are faulty in some way.

A sound absorbing wall element according to the invention may be secured to a frame having a back wall as described above. The wall element can also be used in the construction of other types of walls.

Thus, according to another aspect of the invention, a wall has two layers of which one comprises one or more sound absorbing wall elements according to the invention, and the other comprises a frame provided with one or more cavities containing unbonded pieces of disintegrated tires.

According to a further aspect of the invention, a wall has three layers of which one comprises one or more sound absorbing wall elements according to the invention, a second and adjacent layer comprises a muffling element, and the third layer, which lies adjacent the second layer, is an air cavity enclosed by a frame.

A sound proofing wall constructed with the aid of sound absorbing elements according to the invention needs no external protective covering because the sound absorbing wall elements consist of a waste material that does not easily rot and that has in the past presented considerable problems in its disposal as a waste product. The invention avails itself of this material and puts it to profitable use. The construction of the proposed wall element is such that incident sound waves which enter the irregular network of pores are converted to heat by the friction they generate. The absorption of sound is further improved by the presence of the tire reinforcement which usually comprise textile fibers of reinforcing cord which is processed together with the other parts of the pneumatic tire. Since the sound-absorbing wall elements consist of an inherently elastic inhomogeneous material, the reflected portion of the incident sound waves is very small because some of the kinetic energy of the sound is destroyed. When a sound absorbing wall element according to the invention is used in sound proofing walls near motorways which carry heavy traffic, they have the further advantage of creating no additional impact hazard in the case of an accident since they lack sharp and inelastic components.

A sound absorbing wall element according to the invention, and two walls according to the invention and including such wall element, will now be described, by way of example, with reference to the accompanying drawing.

DESCRIPTION OF PREFERRED EMBODIMENT

Figure 1:
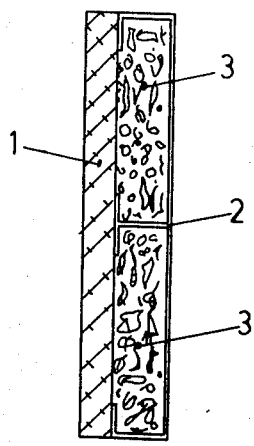
FIG. 1 is a cross-section through a sound-proofing wall containing a sound-absorbing wall element according to the invention.
Figure 2:
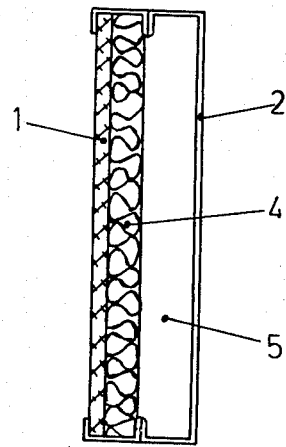
FIG. 2 is a cross-section through a sound-proofing wall which, in addition to the proposed sound-absorbing wall element, contains a further muffling element.

The arrangements of both FIG. 1 and FIG. 2 include a layer 1 of one or more sound-absorbing wall elements. The raw material from which the wall elements are made is motor vehicle tires which are not suitable for their originally intended purpose, either because of wear, or due to faults in manufacture. These tires are disintegrated by being cut into pieces, for example by a shredding machine, and the resulting rubber and reinforcement portions of the tires are bonded together to form the wall elements. The bonding may be achieved in any suitable manner, for example by vulcanisation or by means of an adhesive. The structure of the wall elements thus formed is, of course, irregular, and has pores containing air.

Preferably, the size of the majority of the tires pieces is between 3 and 30 millimeters in length. The tires may be shredded, or cut into chunks rather than lengths, and in the latter case, the length of between 3 and 30 millimeters of each chunk refers to the maximum dimension thereof.

The volume of actual tire parts in each wall element is preferably not more than 60% of the wall element, the remainder of each wall element being air in the pores. The specific gravity of a wall element thus formed is generally less than 0.6 grams per cubic centimeter, and this has been found to attenuate sound effectively.

In FIG. 1 the layer 1 of one or more sound absorbing wall elements, which layer is to face the source of sound, is directly attached by means of a cement or adhesive to a supporting frame 2 formed of sheet metal sections. Cavities 3 in the supporting frame 2 are filled with loose pieces, e.g. shreds, of material from disintegrated pneumatic tires, which shreds form a wall layer and are not connected together by a bonding agent.

In FIG. 2 the layer 1 is fitted into a supporting frame 2 and is backed by an additional wall layer comprising a muffling element 4 which may, for instance, consist of mineral wool. In a conventional manner, the space behind this muffling element 4 forms a further wall layer and serves as a reverberation chamber 5 for reflecting some of the unabsorbed part of the sound which then re-enters the muffling element 4 and the layer 1 a second time from the back. This combination of the layer 1 and muffling element 4 in one sound proofing wall may be used, for instance, to muffle the sound of traffic which, on major roads, embraces a wide range of frequencies.

What is claimed is:

1. In an open air sound-absorbing wall, a sound-absorbing wall element adapted to absorb air-borne sound, said element being composed of shreds of disintegrated reinforced pneumatic rubber tires, said shreds being bonded together to form an irregular weather-resistant panel structure having irregular pores, a majority of said shreds being of a length between 3 and 30 millimeters, said wall element containing a volume of said shreds which is not more than 60% of the volume of the wall element and having a density of less than 0.6 grams per cubic centimeter.

2. A sound-absorbing wall having two layers, one of which comprises a frame provided with at least one cavity containing unbonded pieces of disintegrated reinforced pneumatic rubber tires, and the other of which comprises at least one sound-absorbing wall element as claimed in claim 1.

3. A sound-absorbing wall having three layers, the first layer comprising at least one sound-absorbing wall element as claimed in claim 1, the second layer comprising a muffling element laying adjacent the first layer, and the third layer comprising an air cavity adjacent the second layer and enclosed by a frame.

4. A sound-absorbing wall as claimed in claim 3, in which the muffling element is composed of mineral wool.

* * * * *